(12) United States Patent
Koomthanam et al.

(10) Patent No.: US 11,829,302 B2
(45) Date of Patent: Nov. 28, 2023

(54) DETECTING SEQUENTIAL ACCESS PATTERNS AND PROACTIVE CACHING IN A TREE-BASED FILE SYSTEM

(71) Applicant: Hewlett Packard Enterprise Development LP, Houston, TX (US)

(72) Inventors: Annmary Justine Koomthanam, Bangalore (IN); Jothivelavan Sivashanmugam, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 61 days.

(21) Appl. No.: 17/466,825

(22) Filed: Sep. 3, 2021

(65) Prior Publication Data

US 2023/0071126 A1    Mar. 9, 2023

(51) Int. Cl.
*G06F 12/123* (2016.01)
*G06F 12/02* (2006.01)
*G06F 3/06* (2006.01)
*G06F 12/0891* (2016.01)

(52) U.S. Cl.
CPC .......... *G06F 12/123* (2013.01); *G06F 3/0604* (2013.01); *G06F 3/0659* (2013.01); *G06F 3/0679* (2013.01); *G06F 12/0246* (2013.01); *G06F 12/0891* (2013.01)

(58) Field of Classification Search
CPC .... G06F 12/123; G06F 3/0604; G06F 3/0659; G06F 3/0679; G06F 12/0246; G06F 12/0891
See application file for complete search history.

(56) References Cited

U.S. PATENT DOCUMENTS

| | | | |
|---|---|---|---|
| 5,706,467 A * | 1/1998 | Vishlitzky | G06F 12/123 |
| | | | 711/E12.072 |
| 8,019,945 B2 | 9/2011 | Revanuru | |
| 8,935,446 B1 | 1/2015 | Shilane et al. | |
| 9,086,973 B2 | 7/2015 | Vorbach | |
| 9,189,402 B1 | 11/2015 | Smaldone et al. | |
| 9,235,531 B2 | 1/2016 | Celis et al. | |
| 9,304,914 B1 | 4/2016 | Douglis et al. | |
| 9,390,116 B1 | 7/2016 | Li et al. | |
| 9,665,658 B2 | 5/2017 | Eads et al. | |
| 10,101,917 B1 | 10/2018 | Agans | |
| 2006/0265552 A1 * | 11/2006 | Davis | G06F 12/0862 |
| | | | 711/137 |

(Continued)

Primary Examiner — Tasnima Matin
(74) Attorney, Agent, or Firm — Hewlett Packard Enterprise Patent Department

(57) ABSTRACT

Examples described herein relate to In some examples, a least recently used (LRU) list used to evict nodes from a cache is traversed, the nodes referencing data blocks storing data in a storage device, the nodes being leaf nodes in a tree representing a file system, and for each traversed node, determining a stride length as an absolute value of a difference between a block offset value of the traversed node and a block offset value of a previously traversed node, comparing the stride length to a proximity threshold, and updating a sequential access pattern counter based at least in part on the comparing; and proactively prefetching nodes from the storage device to the cache when the sequential access pattern counter indicates a detected pattern of sequential accesses to nodes.

17 Claims, 6 Drawing Sheets

(56) References Cited

U.S. PATENT DOCUMENTS

| | | | |
|---|---|---|---|
| 2015/0012500 A1* | 1/2015 | Whitehouse | G06F 16/182 |
| | | | 707/690 |
| 2016/0070744 A1* | 3/2016 | Whitehouse | G06F 16/13 |
| | | | 707/690 |
| 2017/0031823 A1* | 2/2017 | Ross | G06F 12/0862 |
| 2020/0175074 A1 | 6/2020 | Li et al. | |

* cited by examiner

DETECTING SEQUENTIAL ACCESS PATTERNS AND PROACTIVE CACHING IN A TREE-BASED FILE SYSTEM

BACKGROUND

In a tree-based filesystem used to access data stored on storage devices, the nodes in the tree are sometimes cached for better performance. Caching the nodes helps provide faster access and decreases expensive reads of storage devices. The size of the cache may be limited, and the nodes in the cache may be evicted to bring currently referenced nodes into memory. Efficiently managing the cache helps increase performance of a computing system.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
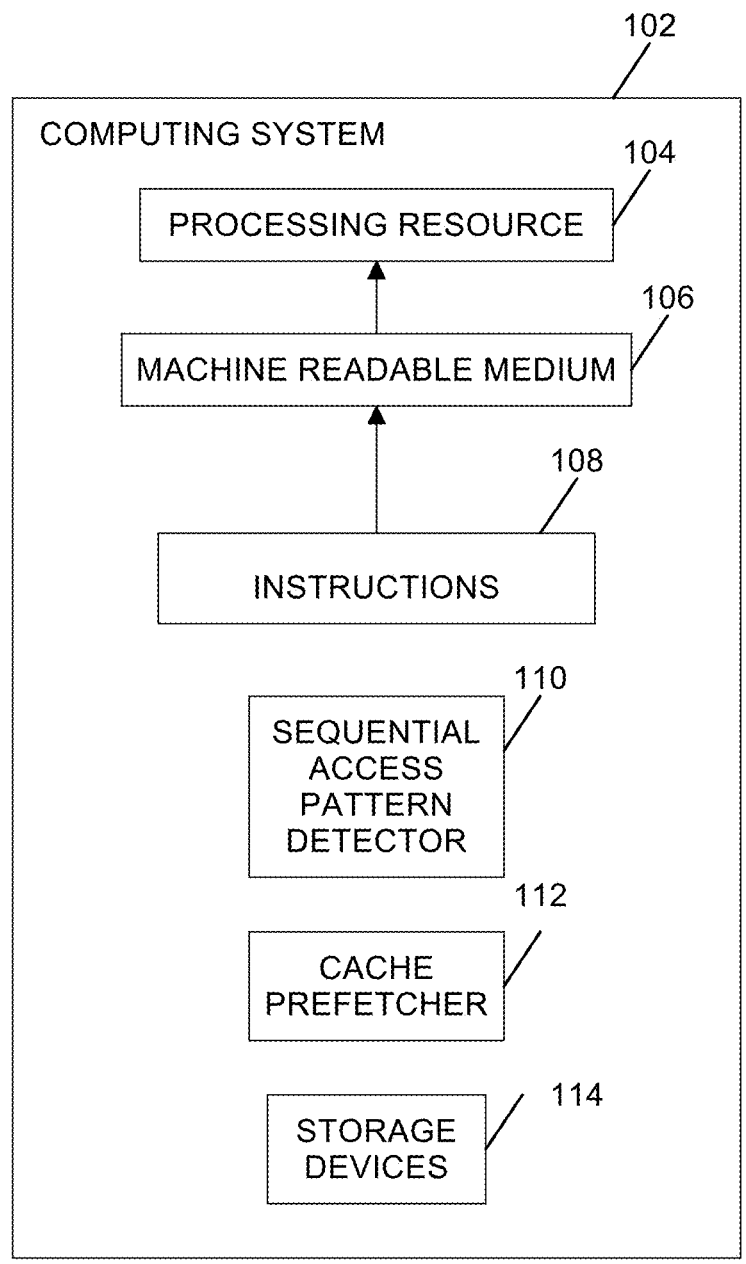
FIG. 1 illustrates an example computing system.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Data may be stored on a computing system, such as a server, a cluster of servers, a computer appliance, a workstation, a storage system, a converged or hyper-converged computing infrastructure, or the like. To store data, some computing systems may utilize a data virtualization platform that abstracts aspects of the physical storage hardware on which the data is physically stored (e.g., aspects such as addressing, configurations, etc.) and presents virtualized or logical storage to a user environment (e.g., operating system, applications, processes). The virtualized storage may be pooled from multiple storage hardware devices (e.g., hard disk drives, solid state drives, etc.). The data virtualization platform may also provide data services such as deduplication, compression, replication, and the like.

In some instances, a data virtualization platform may be object-based. An object-based data virtualization platform may be different from block level storage (e.g., implemented in storage area networks and presented via a storage protocol such as Internet Small Computer Systems Interface (iSCSI) or Fibre Channel) and file level storage (e.g., a virtual file system which manages data in a file hierarchy and is presented via a file level protocol such as Network File System (NFS) or Server Message Block (SMB)/Common Internet File System (CIFS)). In some instances, an object-based data virtualization platform may underlie block or file level storage protocols in some implementations. For example, a file may provide a NFS interface protocol to the user but use object-based data virtualization to store user data. In an object-based platform, data may be stored as objects in an object store. User accessible files and directories may be made up of multiple objects. Each object may be identified by a signature (also referred to as an object fingerprint), which, in some implementations, may include a cryptographic hash digest of the content of that object. The signature can be correlated to a physical address (e.g., a disk location which may include a data block offset value) of the object's data, the signature being included in an object index.

In a tree-based filesystem (e.g., a filesystem that utilizes a hash tree or Merkle tree), some nodes in the tree include references to objects storing data. Caching the nodes in the memory of the computing system may provide faster access to the data in the objects referenced by the nodes and decreases the use of expensive disk reads. However, cache sizes are limited and nodes in the cache may be evicted at times to bring currently referenced nodes into memory. Detecting when nodes should be prefetched into the cache assists in providing improved performance of the computing system implementing the tree-based filesystem.

The technology disclosed herein detects a sequential pattern of accesses to data blocks of objects represented by nodes in a tree-based filesystem. A method starts by determining proximities between the data blocks being accessed over a time period. Records of accesses to data blocks are stored in a least recently used (LRU) list for a cache. Detecting the sequential pattern includes determining a "stride length" as the absolute value of the difference between data block offset values of two consecutive leaf nodes of the tree in the LRU list, comparing the stride length to a proximity threshold (e.g., a configurable maximum allowable difference between addresses of data blocks in a file to be considered substantially sequential) and updating a sequential pattern counter based on the comparison. When analysis of a set of data block accesses indicates (via the sequential pattern counter) that the accesses are considered to be sequential, the technology disclosed herein proactively caches the data blocks likely to be accessed next after those data blocks of the detected sequential pattern. As disclosed herein, data blocks likely to be accessed next after those data blocks of the detected sequential pattern are those data blocks with block offset values greater than the data block value of the last node in the LRU list. In a sequential pattern, read operations are in increasing order of the offsets, since the read operations map to a read of an underlying file.

FIG. 1 illustrates an example computing system 102. The computing system 102 may include any electronic device capable of storing data, processing data, and/or communicating data with external devices over a network. Examples of the computing system 102 may include, but are not limited to, a server, a storage device, a network switch, a router, a mobile communication device, a desktop computer, a portable computer, a smartphone, a tablet computer, or combinations thereof. In some examples, the computing system 102 may be a converged or a hyper-converged storage system. The computing system 102 may be implemented as a storage blade, for example.

In some examples, the computing system 102 may also implement sequential access pattern detector 110 and cache prefetcher 112, as described below.

In some examples, the computing system 102 may be implemented as a physical computing device. In some examples, the computing system 102 may host virtual machine(s), container(s), or containerized application(s) which may utilize resources (e.g., processing power and/or storage capacity) of the computing system 102. The container or containerized application may be located on a single host computing device or distributed across multiple computing devices.

In some examples, as depicted in FIG. 1, the computing system 102 may include a processing resource 104 and a machine-readable medium 106. In an example where the computing system 102 is implemented as a physical computing device, the processing resource 104 and the machine-readable medium 106 may represent physical elements within the computing system 102. The term computing device as used herein may refer to any electronic device capable of processing and/or manipulating data and may have a processing resource to perform such operations. Various examples of such computing device may include, but are not limited to, a desktop computer, a laptop, a smartphone, a server, a computer appliance, a workstation, a storage system, a smartphone, a tablet computer, or a converged or hyper-converged system, and the like.

The machine-readable medium 106 may be any electronic, magnetic, optical, or other physical storage device that may store data and/or executable instructions 108. Therefore, the machine-readable medium 106 may be, for example, Random Access Memory (RAM), an Electrically Erasable Programmable Read-Only Memory (EEPROM), a storage drive, a flash memory, a Compact Disc Read Only Memory (CD-ROM), and the like. The machine-readable medium 106 may be non-transitory. As described in detail herein, the machine-readable medium 106 may be encoded with executable instructions 108 for performing one or more methods, for example, the method described in FIG. 5.

The processing resource 104 may be a physical device, such as, for example, one or more central processing units (CPUs), one or more semiconductor-based microprocessors, one or more graphics processing units (GPUs), one or more application-specific integrated circuits (ASICs), one or more field programmable gate arrays (FPGAs), other hardware devices capable of retrieving and executing of the instructions 108 stored in the machine-readable medium 106, or combinations thereof. The processing resource 104 may fetch, decode, and execute the instructions 108 stored in the machine-readable medium 106 to manage the computing system 102, and more particularly, to execute sequential access pattern detector 110 and cache prefetcher 112, which will be described further herein below with respect to FIGS. 3-6. As an alternative or in addition to executing the instructions, the processing resource 104 may include at least one integrated circuit (IC), control logic, electronic circuits, or combinations thereof that include a number of electronic components for performing the functionalities intended to be performed by the computing system 102.

In some examples, as depicted in FIG. 1, the computing system 102 may include one or more storage devices 114 to store data accessed by processing resource 104. Storage devices 114 comprise may be any type of device or devices configured for short-term or long-term storage of data such as, for example, memory devices and circuits, memory cards, hard disk drives, solid-state drives (SSDs), non-volatile flash memory, or other data storage devices.

Figure 2:
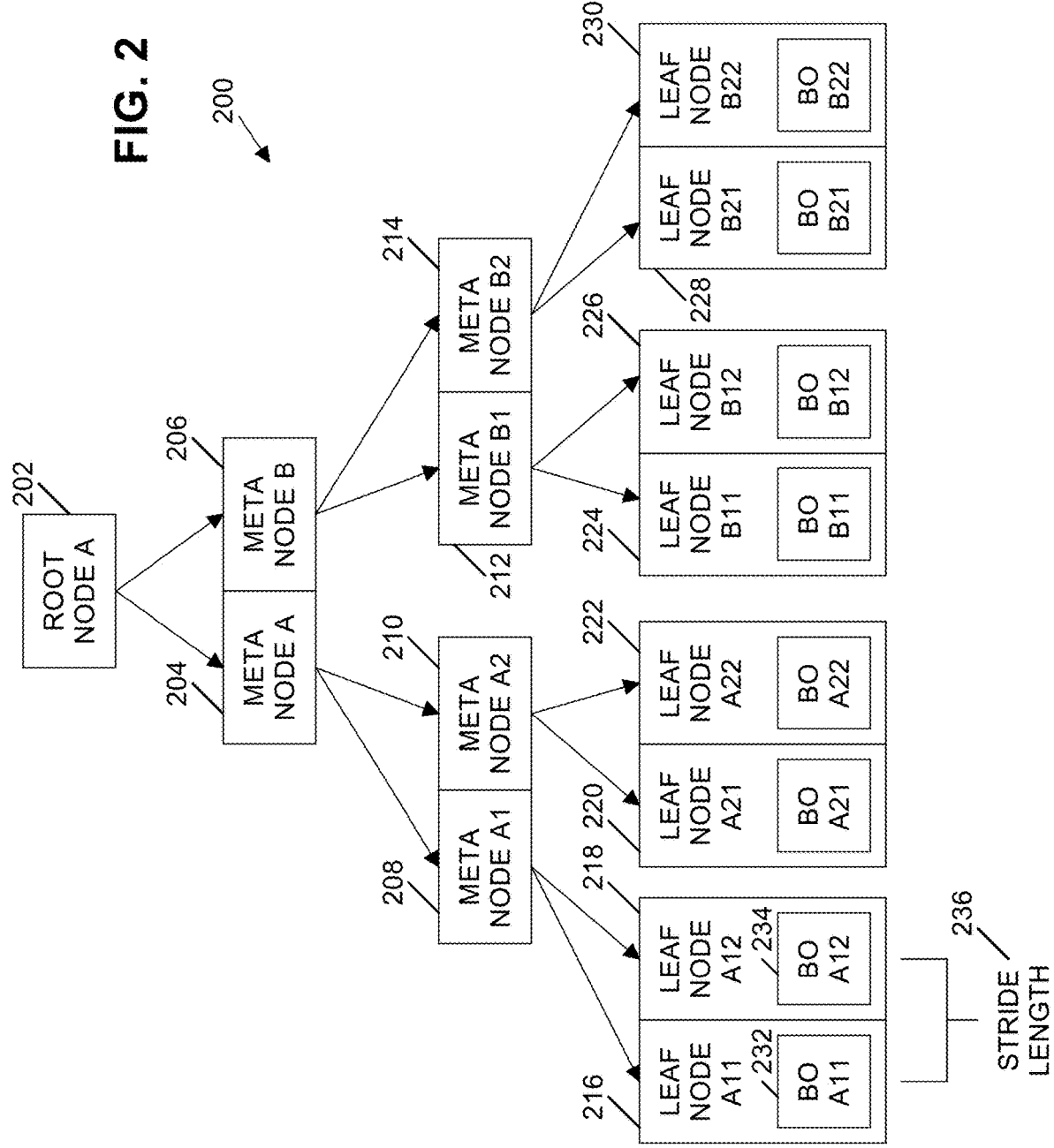
FIG. 2 illustrates an example tree.

FIG. 2 illustrates an example tree. Objects may be hierarchically related to a root object (e. g., root node A 202) in an object tree 200 or any other hierarchical arrangement (e.g., directed acyclic graphs, etc.). In an example, the object tree 200 may also be referred to as a hive object tree. In an example, the hive object tree 200 comprises a Merkle tree. The hierarchical arrangement of objects is referred to herein as a file system instance. Conceptually, file data (for example, a virtual machine disk (vmdk) file) is split into unit size objects and cryptographic hashes of objects are calculated. The cryptographic hashes of the file data are stored in the leaf of the tree. The parent node stores the hashes of its children. This hashing scheme continues all the way to the top of the hive object tree and results in a single hive root signature (e.g., encompassing all nodes of the tree).

In the case of a hierarchical tree (e.g., object tree 200), the lowest level tree node of any branch (that is, the most distant from the root object) is a data object that stores a user data signature, and is also referred to as a leaf data object (e.g., leaf node A11 216, leaf node A12 218, leaf node A21 220, leaf node A22 222, leaf node B11 224, leaf node B12 226, leaf node B21 228, and leaf node B22 230). Each leaf node is associated with a block offset value, which may be related to the position of the leaf node in the tree. For example, leaf node A11 216 stores a block offset (BO) A11 232, and leaf node A12 218 stores BO A12 234. A stride length 236 between the two nodes (for example, leaf node A11 216 and leaf node A12 218) is calculated as the absolute value of the difference between the block offset values of the nodes (for example, BO A11 232 and BO A12 234). The user data signatures are stored in an object index where the key is the hash and the value points to the physical storage location of the node. The parent tree node of leaf data objects is a metadata object (e. g., meta node A1 208, meta node A2 210, meta node B1 212, meta node B2 214) that stores as its content the signatures of its child leaf data objects. The root and internal nodes of a tree may also be metadata objects that store as content the signatures of child objects.

A metadata object may be able to store a number of signatures that is at least equal to a branching factor of the hierarchical tree, so that it may hold the signatures of all of its child objects. In some implementations, data objects may be larger in size than metadata objects. For example, metadata objects may be 1 kibibyte (kib) while data objects may be 4 or 8 kib. In FIG. 2, a branching factor of 2 is shown, but in other object trees that branching factor can be any natural number (such as 4, 8, 16, 32, and so on). In one example object tree, the branching factor is 48. Metadata object signatures are also stored in the object index.

By knowing the root hash, the branch factor, tree height, and data block size, the hive object tree 200 may be traversed to access data at any arbitrary offset within the hive's data. If a leaf node is to be accessed to extract the data signature and the node is not present in memory, its nearest parent in memory is located, and tree traversal expands from the parent to the leaf node.

Addresses of the nodes are stored in a hash map, with a key for a node being derived from a node's data block offset, height of the node, inode number and inode sub tree type and value as the pointer of the node. This is useful for indexing the nodes, based on their block offset and inode number, and locating the address of a node in memory, given a file offset and an inode number.

In an example hyper-converged computing system (such as computing system 102), each guest virtual machine (VM) running on a datastore can be represented by a hive object tree 200, (such as a Merkle tree). As noted above, the hive data objects can be represented in memory by a Merkle tree in which each node stores the cryptographic hash of child nodes and the node is identified by the hash of its content and stored in its parent.

In some storage systems, a cache is managed by evicting nodes which are no longer referenced (e.g., a node is in a full cache but has not been recently accessed by the hive and a new node is to be stored into the cache). An example hive process keeps most recently used nodes in memory and least recently used nodes are evicted from memory. But this method may suffer from poor performance when the workload is sequential. For a sequential read and write workload, the caching based on a most recently used access pattern may not provide significant cache benefits. Such caching method may adversely affect performance of computing system 102, because of the constant thrashing of nodes in and out of memory (such as machine-readable medium 106). Sequential access may result in a low cache hit ratio, and the cached nodes are repeatedly evicted from memory to make room for the new nodes. Sequential accesses may result in a low cache hit ratio because the hive has to repeatedly evict cached nodes from the cache to make room for the new nodes being sequentially accessed.

The technology disclosed herein describes a technique by which a workload pattern of accessing data objects can be detected (by sequential access pattern detector 110) based on eviction patterns from the cache and if the pattern is found to be sequential, proactive caching for sequential workloads can be performed (by cache prefetcher 112). This approach may improve the performance of computing system 102 for sequential workloads while avoiding negative impacts on the performance of other workloads.

In contrast to a "best effort" cache synchronization method, the lightweight method described herein caches nodes based on the detected access pattern which results in a higher cache hit ratio, thereby providing lower latency and higher throughput than other approaches. In an example, the access pattern is determined by the proximity between the nodes in the eviction list for the cache. The method uses the pattern of eviction to determine the pattern of access, thereby predicting which nodes are likely to be accessed next, and proactively prefetches those nodes into memory for future processing.

Figure 3:
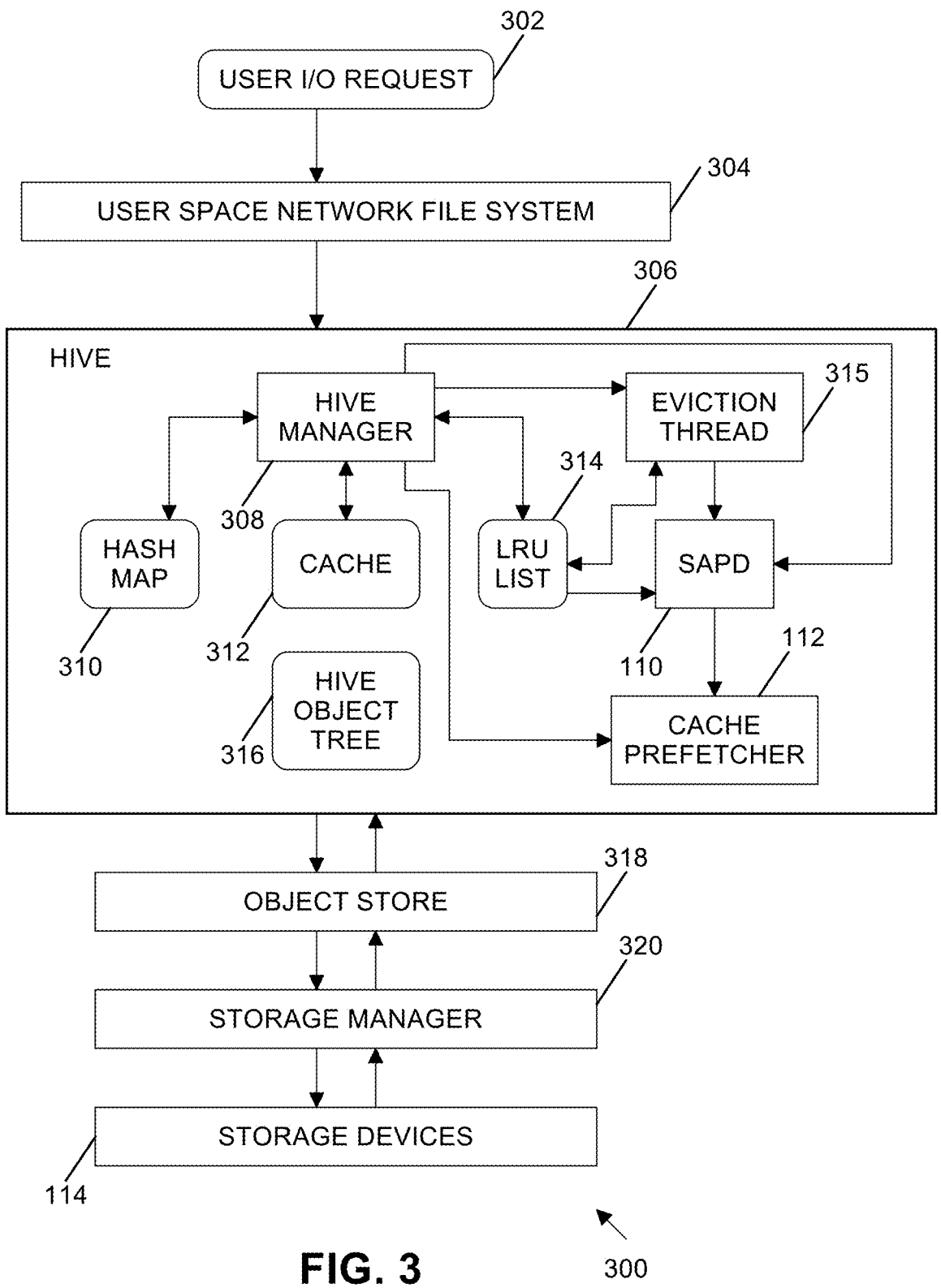
FIG. 3 illustrates a storage management system according to an example.

FIG. 3 illustrates a storage management system 300 according to an example. Storage management system 300 may be implemented in computing system 102 of FIG. 1. A user of computing system 102 sends a user input/output (I/O) request 302 to a user space network file system 304. The user I/O request may be a request to read data from or write data to one or more storage devices 114. User space network file system 304 manages accesses to storage devices 114 via hive 306, object store 318 (storing a map of key-value pairs with object signatures as keys and storage device physical locations as values), and storage manager 320. Hive 306 comprises a per-VM file system and contains all the files pertaining to the VM. A hive 306 is represented as hive object tree 316 in memory. In some implementations, the hive object tree 316 is built up by connecting individual file object trees together and forming a larger hive object tree.

Hive 306 includes a hive manager 308 to manage hash map 310, cache 312, least recently used (LRU) list 314 for cache 312, and hive object tree 316. Hive manager 308 uses hash map 310 to look up memory addresses for nodes of the hive object tree 316 (e.g., a Merkle tree (such as hive object tree 200) created in memory to represent user data objects). In an example, a key for the hash map 310 is a function of the node's location in the hive object tree 316 and value is a memory address of the data object referenced by the node.

The cache 312 stores nodes in memory (such as a portion of machine-readable medium 106 (e.g., a dynamic read access memory (DRAM)). The memory used by cache 312 is allocated at the time of start-up of computing system 102 (which may implement storage management system 300) and managed by the hive manager 308. When user I/O requests 302 are continuously serviced by the hive 306 using hive object tree 316, portions of the hive object tree 316 may expand and eventually the memory footprint may grow large. When the free memory in the cache 312 goes below a threshold level, the hive manager 308 schedules an eviction processing thread to be run on processing resource 104. The eviction processing thread reclaims memory from the least recently used nodes of the hive object tree 316.

The hive manager 308 uses LRU list 314 to maintain the nodes that are not referenced. Nodes that are unreferenced, which can be potentially garbage collected to accommodate newly referenced nodes, are added to the LRU list 314. In an example, the eviction processing thread may be run periodically to garbage collect the unreferenced nodes from the LRU list 314.

When a node is not actively referenced by other nodes in the hive object tree 316, the node is added to the LRU list 314. At the time of garbage collection, the eviction processing thread starts evicting the nodes. The node identified for eviction is deleted from memory and the space consumed by that node in memory is reclaimed.

Thus, the LRU list 314 maintains a list of nodes that are not referenced any more for hive object tree 316 in hive 306. In one example, the LRU list 314 is ordered with nodes least recently unreferenced at the head of the list and nodes most recently unreferenced at the tail of the list. The eviction of the nodes starts from the head of the LRU list 314 (e.g., from the oldest least referenced nodes).

In an example, sequential access pattern detector (SAPD) 110 traverses LRU list 314 to detect sequential access patterns to nodes resulting for execution of user I/O requests 302, which will be described further with reference to FIG. 4. If a sequential access pattern is detected by SAPD 110, cache prefetcher 112 prefetches selected nodes of hive object tree 316 from storage devices 114 and instructs hive manager 308 of hive 306 to store these nodes in cache 312.

Figure 4:
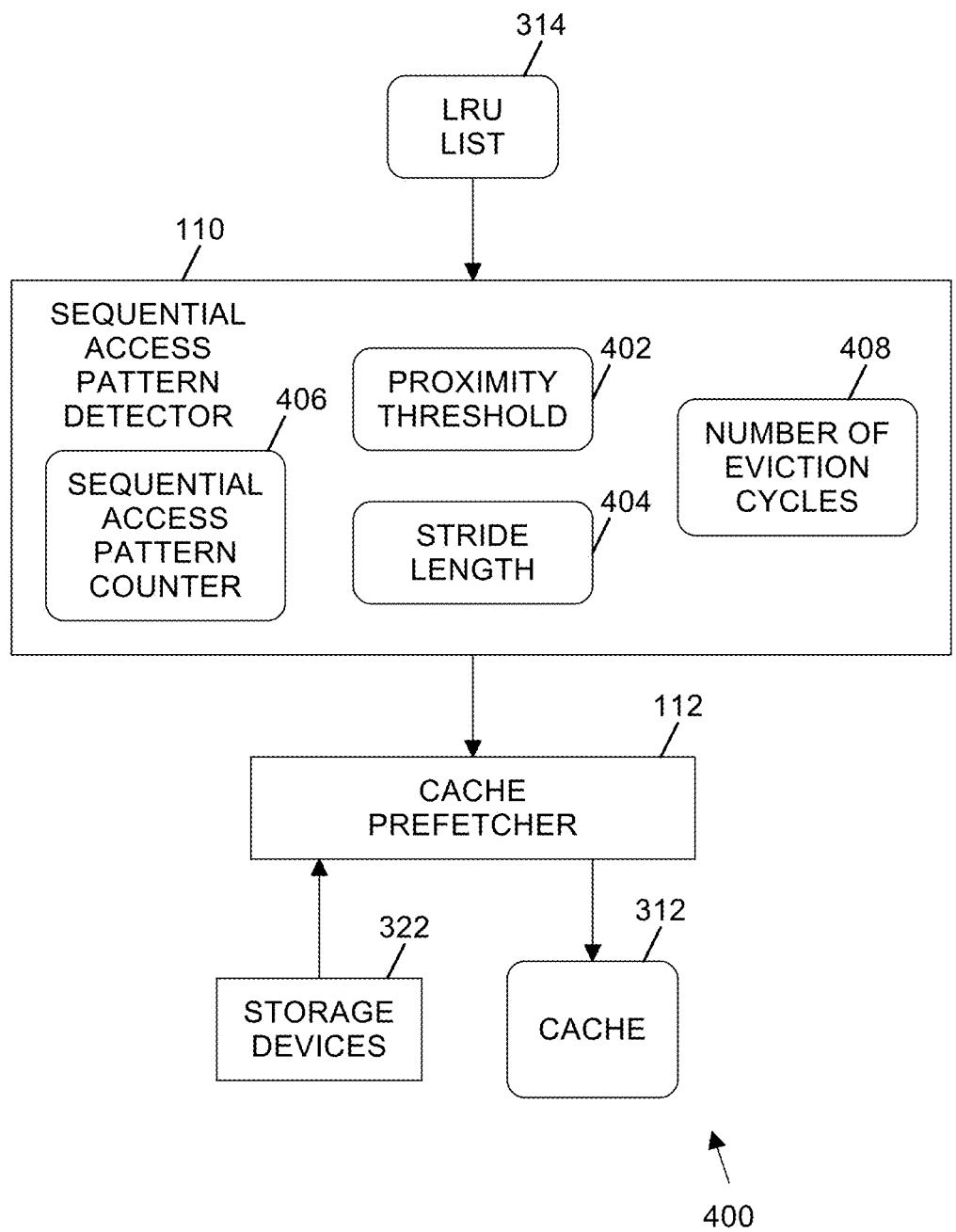
FIG. 4 illustrates a computing arrangement for sequential access pattern matching and cache prefetching according to an example.

FIG. 4 illustrates a computing arrangement 400 for sequential access pattern detecting and cache prefetching according to an example. In an implementation, a counter, called a sequential access pattern counter 406 herein, is maintained to measure the likelihood of a sequential workload of user I/O requests 302. The value of sequential access pattern counter 406 is calculated by sequential access pattern detector 110 based at least in part on the proximity of block offset values of nodes in the LRU list 314. As used herein, the proximity is a difference between the block offset of the nodes. The block offset may be a function of the user data offset represented by that node.

A stride length 404 between the two nodes is calculated as the absolute value of the difference between the block offset values of the nodes. The stride length 404 is compared against a proximity threshold 402. In an example, the proximity threshold is configured by a system administrator of computing systems 102. If the stride length 404 is less than the proximity threshold 402, the nodes are deemed to be near to each other in the hive object tree 316 and the sequential access pattern counter 406, in an example, is incremented.

Although the sequential access pattern counter 406, proximity threshold 402 and number of eviction cycles 408 are shown in FIG. 4 as being integral with sequential access pattern detector 110 in this example, in other examples one or more of the sequential access pattern counter 406, proximity threshold 402 and number of eviction cycles 408 may be situated in other locations within computing system 102. For example, when sequential access pattern detector and/or cache prefetcher 112 are implemented in computing hardware of computing system 102 (e.g., within the circuitry of a processor, for example), one or more of the sequential access pattern counter 406, proximity threshold 402 and number of eviction cycles 408 may be implemented as registers or locations in a memory access by processing resource 104.

An example of pseudo code for calculating a stride length 404 between two nodes of hive object tree 316 and updating a sequential access pattern counter 406 is shown below.

```
stride_length = absolute value
(leaf_node2_block_offset − leaf_node1_block_offset)
if (stride_length < proximity threshold)
{seq_counter++}
```

Returning back to FIG. 3, each node of hive object tree 316 stores a block offset of the data object represented by the node and height of the node (e.g., level of the node in the hive object tree). Hive manager 308 calls eviction thread 315 to manage evictions from the cache 312. When the eviction thread 315, during the eviction cycle, encounters a leaf node, the eviction thread 315 calls sequential access pattern detector 110 to calculate the distance of the node from the previous leaf node encountered (e.g., difference between block offsets of nodes, that is, the stride length 404). The sequential access pattern counter 406 is updated based on the calculated stride length. For example, if the calculated stride length calculated is within the proximity threshold, then the sequential access pattern counter 406 is updated incremented. If the node encountered is not within the proximity threshold 402 of the previous node, then the sequential access pattern counter 406 is decremented.

At the end of an eviction cycle if the value of the sequential access pattern counter indicates the workload pattern is sequential, then hive manager 308 of hive 306 asserts that the pattern of I/O requests is sequential. For example, if the sequential access pattern counter 406 is positive, then the I/O accesses are assumed to be sequential. Since the sequential access pattern counter 406 is penalized (e.g., decremented) every time a node is encountered that is not within the proximity threshold 402, in an example it can be assumed that a positive sequential access pattern counter value can be obtained only when the workload pattern is sequential.

After a number of eviction cycles 408 has been reached, if the sequential access pattern counter 406 is still positive, then sequential access pattern detector 110 notifies cache prefetcher 112 to start a proactive caching processing thread. In an example, number of eviction cycles 408 is configurable by a system administrator of computing systems 102.

The cache prefetcher 112 starts pre-fetching nodes from the one or more storage devices 114 (via object store 318) into cache 312 for the nodes with block offsets greater than the block offset of the node at the tail of the LRU list 314. That is, the cache prefetcher pre-fetches nodes into the cache based at least in part on a predicted sequential pattern. The proactive caching thread of cache prefetcher 112 fills the memory for the cache 312 until a low watermark of the free cache space is reached.

If the node corresponding to a pre-fetch operation is already a recently referenced node, this node is already in the cache 312 and can be located using the hash map 310. These nodes are not added to the LRU list 314 because these nodes are being actively referenced. Trying to fetch a node already in cache 312 will not result in additional operations because the first step to locate a node is to check for the node in the hash map 310. If the node is present in the hash map 310, then no further operations are performed, since the hash map stores cached metanodes. If the node is not present in the hash map 310, the signature of the node (retrieved from the parent node in the hive object tree 316) is looked up in the object index of the hive object tree 316 and the node's corresponding location in storage device 114 is retrieved and the node's data block is fetched from storage device 114 into the cache 312.

The foregoing techniques can decrease the latency and increase the throughput for sequential read workloads because identifying a sequential workload and pre-fetching nodes according to the sequential workload pattern improves the cache hit ratio. These techniques do not interfere in the regular eviction process and are lightweight. These techniques can significantly improve the quality of service for read oriented workloads like analytical applications.

Figure 5:
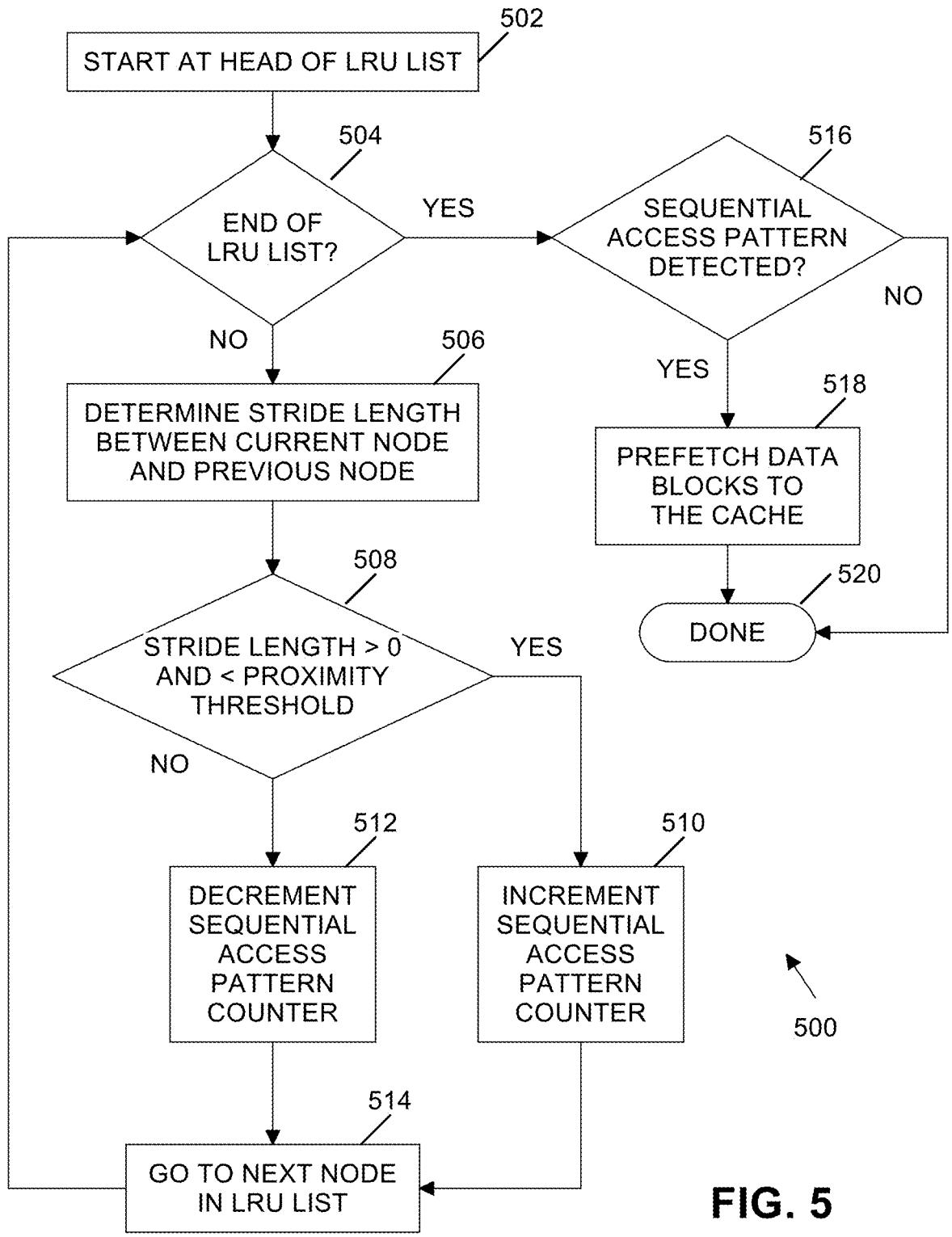
FIG. 5 illustrates sequential access pattern detecting and cache prefetching processing according to an example.

FIG. 5 illustrates sequential access pattern detection and cache prefetching according to an example. FIG. 5 is a flow diagram depicting a method 500, in accordance with an example. The method 500 will be described in conjunction with the sequential access pattern detector 110 and cache prefetcher 112 of computing system 102 of FIG. 1, FIG. 3, and FIG. 4. As will be appreciated, method steps represented by blocks 502, 504, 506, 508, 510, 512, 514, 516, 518, and 520 (hereinafter collectively referred to as 502-520) may be performed by processing resources 104 of a computing system, for example, the computing system 102. In particular, each such method blocks 502-520 may be executed by the processing resource 104 by executing the instructions 108 stored in the machine-readable medium 106.

At block 502, sequential access pattern detector processing starts at the head of LRU list 314. In an example, the sequential access pattern counter is initialized to zero at the start of processing of FIG. 5. At block 504, if the end of the LRU list 314 is not reached, then at block 506 sequential access pattern detector 110 determines a stride length between a current node in the LRU list 314 and a previous node in the LRU list. When processing the head of the LRU list (e.g., during a first iteration), the current node is the same as the previous node. At block 508, sequential access pattern detector 110 determines if the stride length of the current node is greater than zero and less than the proximity threshold. A sequential access pattern counter 406 is updated according to the determination of block 508. For example, if the stride length of the current node is greater than zero and less than the proximity threshold then sequential access pattern detector increments sequential access pattern counter 406 at block 510. If the stride length of the current node is not greater than zero or not less than the proximity threshold then sequential access pattern detector decrements the sequential access pattern counter 406 at block 512.

At block 514, sequential access pattern detector 110 traverses to the next node in the LRU list 314. This next node becomes the current node, and the former current node becomes the previous node. Processing continues back at block 504.

At block 504, if the end of the LRU list 314 is reached, then at block 516 sequential access pattern detector 110 checks the value of sequential access pattern counter 406. In an example, if sequential access pattern counter 406 is positive, a sequential access pattern has been detected in this eviction cycle. If a sequential access pattern has been detected, at block 518 sequential access pattern detector 110 calls cache prefetcher 112 to prefetch data blocks to the cache 312 and processing ends at block 520. In an example, cache prefetcher 112 prefetches data blocks with block offsets greater than the block offset in the tail node of the LRU list 314 until the cache 312 is filled to its low water mark. If a sequential access pattern has not been detected at block 516, processing ends at block 520. In an example, the processing described in FIG. 5 may be repeated for each eviction cycle up to number of eviction cycles 408.

Figure 6:
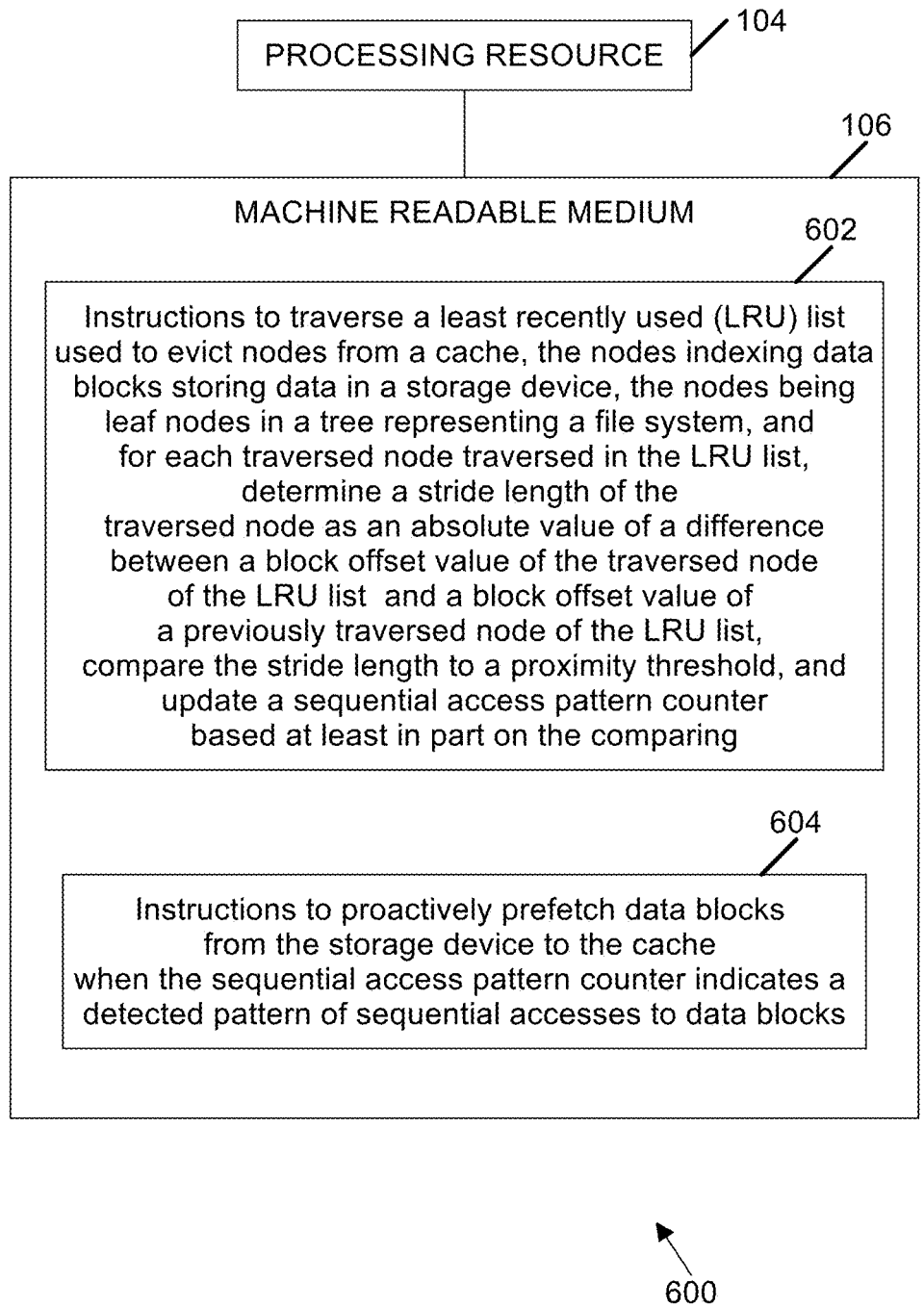
FIG. 6 is a block diagram depicting a processing resource and a machine-readable medium encoded with example instructions to perform sequential access pattern detecting and cache prefetching processing.

In FIG. 6, a block diagram 600 depicting a processing resource 104 and a machine-readable medium 106 encoded with example instructions to perform sequential access pattern detecting and cache prefetching is presented, in accordance with an example. The machine-readable medium 106 may be non-transitory and is alternatively referred to as a non-transitory machine-readable medium 106. In some examples, the machine-readable medium 106 may be accessed by the processing resource 104.

The machine-readable medium 106 may be any electronic, magnetic, optical, or other physical storage device that may store data and/or executable instructions. Therefore, the machine-readable medium 106 may be, for example, RAM, an EEPROM, a storage drive, a flash memory, a CD-ROM, and the like. As described in detail herein, the machine-readable medium 106 may be encoded with executable instructions 602-604 for performing one or more methods, for example, the method 500 described in FIG. 5. The instructions 602-604 may represent one example of the instructions 108 of FIG. 1.

The processing resource 104 may be a physical device, for example, one or more CPU, semiconductor-based microprocessor, GPU, ASIC, FPGA, or other hardware device capable of retrieving and executing of the instructions 602-604 stored in the machine-readable medium 106, or combinations thereof. In some examples, the processing resource 104 may fetch, decode, and execute the instructions 602-604 stored in the machine-readable medium 106 to perform sequential access pattern detecting and cache prefetching. In certain examples, as an alternative or in addition to retrieving and executing the instructions 602-604, the processing resource 104 may include at least one integrated circuit, control logic, other electronic circuits, or combinations thereof that include a number of electronic components for performing the functionalities intended to be performed by the computing system 102.

The instructions 602, when executed, may cause the processing resource 104 to traverse a least recently used (LRU) list used to evict nodes from a cache. The nodes index data blocks storing data in a storage device and include leaf nodes in a tree representing a file system.

For each traversed node traversed in the LRU list, instructions 602 cause the processing resource 104 to determine a stride length of the traversed node as an absolute value of a difference between a block offset value of a data block of the traversed node of the LRU list and a block offset value of a data block of a previously traversed node of the LRU list, compare the stride length to a proximity threshold, and update a sequential access pattern counter based at least in part on the comparing.

The instructions 604, when executed, may cause the processing resource 104 to proactively prefetch data blocks from the storage device to the cache when the sequential access pattern counter indicates a detected pattern of sequential accesses to data blocks.

While certain implementations have been shown and described above, various changes in form and details may be made. For example, some features, functions, and/or formulas/equations that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A computer-implemented method comprising:
   traversing a least recently used (LRU) list used to evict nodes from a cache, the nodes referencing data blocks storing data in a storage device, the nodes being leaf nodes in a tree representing a file system;
   for each traversed node traversed in the LRU list:
   determining a stride length of the traversed node as an absolute value of a difference between a block offset value of the traversed node of the LRU list and a block offset value of a previously traversed node of the LRU list,
   comparing the stride length to a proximity threshold, and
   updating a sequential access pattern counter based at least in part on the comparing; and proactively prefetching nodes from the storage device to the cache when the sequential access pattern counter indicates a detected pattern of sequential accesses to nodes.

2. The computer-implemented method of claim 1, wherein traversing the nodes of the LRU list comprises traversing the LRU list from a head node of the LRU list to a tail node of the LRU list, wherein the head node of the LRU list is a least recently unreferenced node, and the tail node of the LRU list is a most recently unreferenced node.

3. The computer-implemented method of claim 2, wherein nodes proactively prefetched into the cache comprise nodes having block offset values greater than a block offset value of a node referenced by the tail node of the LRU list.

4. The computer-implemented method of claim 1, wherein the proximity threshold comprises a configurable maximum allowable difference between locations of nodes in a file.

5. The computer-implemented method of claim 1, wherein the updating includes:
incrementing the sequential access pattern counter when the absolute value of the difference between the block offset value of the traversed node of the LRU list and the block offset value of the previously traversed node of the LRU list is less than the proximity threshold, and
decrementing the sequential access pattern counter when the absolute value of when the difference between the block offset value of the traversed node of the LRU list and the block offset value of the previously traversed node of the LRU list is not less than the proximity threshold,
wherein the sequential access pattern counter indicates the detected pattern of sequential accesses to nodes when the sequential access pattern counter is positive.

6. The computer-implemented method of claim 1, comprising performing the traversing for a configurable number of eviction cycles.

7. A non-transitory machine-readable medium storing instructions executable by a processing resource, the instructions comprising:
instructions to traverse a least recently used (LRU) list used to evict nodes from a cache, the nodes referencing data blocks storing data in a storage device, the nodes being leaf nodes in a tree representing a file system;
instructions to process each traversed node traversed in the LRU list by:
determining a stride length of the traversed node as an absolute value of a difference between a block offset value of the traversed node of the LRU list and a block offset value of a previously traversed node of the LRU list,
comparing the stride length to a proximity threshold, and
updating a sequential access pattern counter based at least in part on the comparing; and
instructions to proactively prefetch nodes from the storage device to the cache when the sequential access pattern counter indicates a detected pattern of sequential accesses to nodes.

8. The non-transitory machine-readable medium of claim 7, wherein a head node of the LRU list is a least recently unreferenced node, and a tail node of the LRU list is a most recently unreferenced node.

9. The non-transitory machine-readable medium of claim 8, wherein nodes proactively prefetched into the cache comprise nodes having block offset values greater than a block offset value of a node referenced by the tail node of the LRU list.

10. The non-transitory machine-readable medium of claim 7, wherein the proximity threshold comprises a configurable maximum allowable difference between locations of nodes in a file.

11. The non-transitory machine-readable medium of claim 8, further comprising:
instructions to increment the sequential access pattern counter when the absolute value of the difference between the block offset value of the traversed node of the LRU list and the block offset value of the previously traversed node of the LRU list is less than the proximity threshold, and
instructions to decrement the sequential access pattern counter when the absolute value of when the difference between the block offset value of the traversed node of the LRU list and the block offset value of the previously traversed node of the LRU list is not less than the proximity threshold, wherein the sequential access pattern counter indicates the detected pattern of sequential accesses to nodes when the sequential access pattern counter is positive.

12. An apparatus, comprising:
a sequential access pattern detector to:
traverse a least recently used (LRU) list used to evict nodes from a cache, the nodes referencing data blocks storing data in a storage device, the nodes being leaf nodes in a tree representing a file system, and
for each traversed node traversed in the LRU list:
determine a stride length of the traversed node as an absolute value of a difference between a block offset value of the traversed node of the LRU list and a block offset value of a previously traversed node of the LRU list,
compare the stride length to a proximity threshold, and
update a sequential access pattern counter based at least in part on the comparing; and
a cache prefetcher to proactively prefetch nodes from the storage device to the cache when the sequential access pattern counter indicates a detected pattern of sequential accesses to nodes.

13. The apparatus of claim 12, wherein a head node of the LRU list is a least recently unreferenced node, and a tail node of the LRU list is a most recently unreferenced node.

14. The apparatus of claim 13, wherein nodes proactively prefetched into the cache comprise nodes having block offset values greater than a block offset value of a node referenced by the tail node of the LRU list.

15. The apparatus of claim 12, wherein the proximity threshold comprises a configurable maximum allowable difference between locations of data blocks in a file.

16. The apparatus of claim 12, wherein the sequential access pattern detector is to
increment the sequential access pattern counter when the absolute value of the difference between the block offset value of the traversed node of the LRU list and the block offset value of the previously traversed node of the LRU list is less than the proximity threshold, and
decrement the sequential access pattern counter when the absolute value of when the difference between the block offset value of the traversed node of the LRU list and the block offset value of the previously traversed node of the LRU list is not less than the proximity threshold, wherein the sequential access pattern counter indicates the detected pattern of sequential accesses to nodes when the sequential access pattern counter is positive.

17. The apparatus of claim 12, wherein the sequential access pattern detector is to perform the traversing for a configurable number of eviction cycles.

* * * * *